(12) United States Patent
Lin et al.

(10) Patent No.: US 9,467,637 B2
(45) Date of Patent: Oct. 11, 2016

(54) IMAGE SENSOR WITH MULTI-SHARED PIXEL ARCHITECTURE AND DUAL READOUT PATH

(71) Applicant: Himax Imaging Limited, Tainan (TW)

(72) Inventors: Dong-Long Lin, Grand Cayman (KY); Chung-Ren Li, Grand Cayman (KY); Chung-Wei Chang, Grand Cayman (KY)

(73) Assignee: Himax Imaging Limited, Tainan (TW)

( * ) Notice: Subject to any disclaimer, the term of this patent is extended or adjusted under 35 U.S.C. 154(b) by 112 days.

(21) Appl. No.: 14/217,254

(22) Filed: Mar. 17, 2014

(65) Prior Publication Data

US 2015/0181142 A1 Jun. 25, 2015

(30) Foreign Application Priority Data

Dec. 25, 2013 (TW) .............................. 102148290 A

(51) Int. Cl.
*H04N 5/378* (2011.01)
*H04N 5/353* (2011.01)
*H04N 5/3745* (2011.01)

(52) U.S. Cl.
CPC ............ *H04N 5/378* (2013.01); *H04N 5/3532* (2013.01); *H04N 5/37457* (2013.01)

(58) Field of Classification Search
CPC ...................................................... H04N 5/378

USPC ............................... 348/302, 294; 250/208.1
See application file for complete search history.

(56) References Cited

U.S. PATENT DOCUMENTS

| 2005/0237405 | A1* | 10/2005 | Ohkawa | H01L 27/14641 348/308 |
| 2006/0175538 | A1* | 8/2006 | Kim | H01L 27/14603 250/208.1 |
| 2007/0145237 | A1* | 6/2007 | Ohkawa | H01L 27/14603 250/208.1 |
| 2009/0251582 | A1 | 10/2009 | Oike | |
| 2010/0051784 | A1* | 3/2010 | Parks | H04N 3/1562 250/208.1 |
| 2010/0225795 | A1* | 9/2010 | Suzuki | H01L 27/14609 348/300 |

FOREIGN PATENT DOCUMENTS

TW 201126707 8/2011
TW 201216699 4/2012

* cited by examiner

*Primary Examiner* — Nhan T Tran
*Assistant Examiner* — Chan Nguyen
(74) *Attorney, Agent, or Firm* — Winston Hsu; Scott Margo

(57) ABSTRACT

An image sensor includes an M-shared pixel architecture, an N-shared pixel architecture and a switch unit, wherein M is an integer not smaller than two and N is an integer not smaller than two. The switch unit is coupled between a floating diffusion node of the M-shared pixel architecture and a floating diffusion node of the N-shared pixel architecture.

10 Claims, 5 Drawing Sheets

IMAGE SENSOR WITH MULTI-SHARED PIXEL ARCHITECTURE AND DUAL READOUT PATH

BACKGROUND OF THE INVENTION

1. Field of the Invention

The disclosed embodiments of the present invention relate to an image sensor, and more particularly, to a multi-shared pixel architecture with a dual readout path.

2. Description of the Prior Art

In digital electronic devices, as pixel counts increase while pixel sizes shrink, the readout speed in a pixel layout will be negatively affected. One way to improve the frame rate is to reduce the readout time by using a high speed circuit; the conventional high speed design is complicated and difficult, however, and also results in an increased cost and chip area. Therefore, there is a need for a novel image sensor to solve the problem.

SUMMARY OF THE INVENTION

One of the objectives of the present invention is to provide a multi-shared pixel architecture such as an 8-shared pixel architecture with a dual readout path.

According to an embodiment of the present invention, an image sensor is disclosed. The image sensor comprises an M-shared pixel architecture, an N-shared pixel architecture and a switch unit, wherein both M and N are integers not smaller than two. The switch unit is coupled between a floating diffusion node of the M-shared pixel architecture and a floating diffusion node of the N-shared pixel architecture.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "coupled" is intended to mean either an indirect or direct electrical connection. Accordingly, if one device is coupled to another device, that connection may be through a direct electrical connection, or through an indirect electrical connection via other devices and connections.

Figure 1:
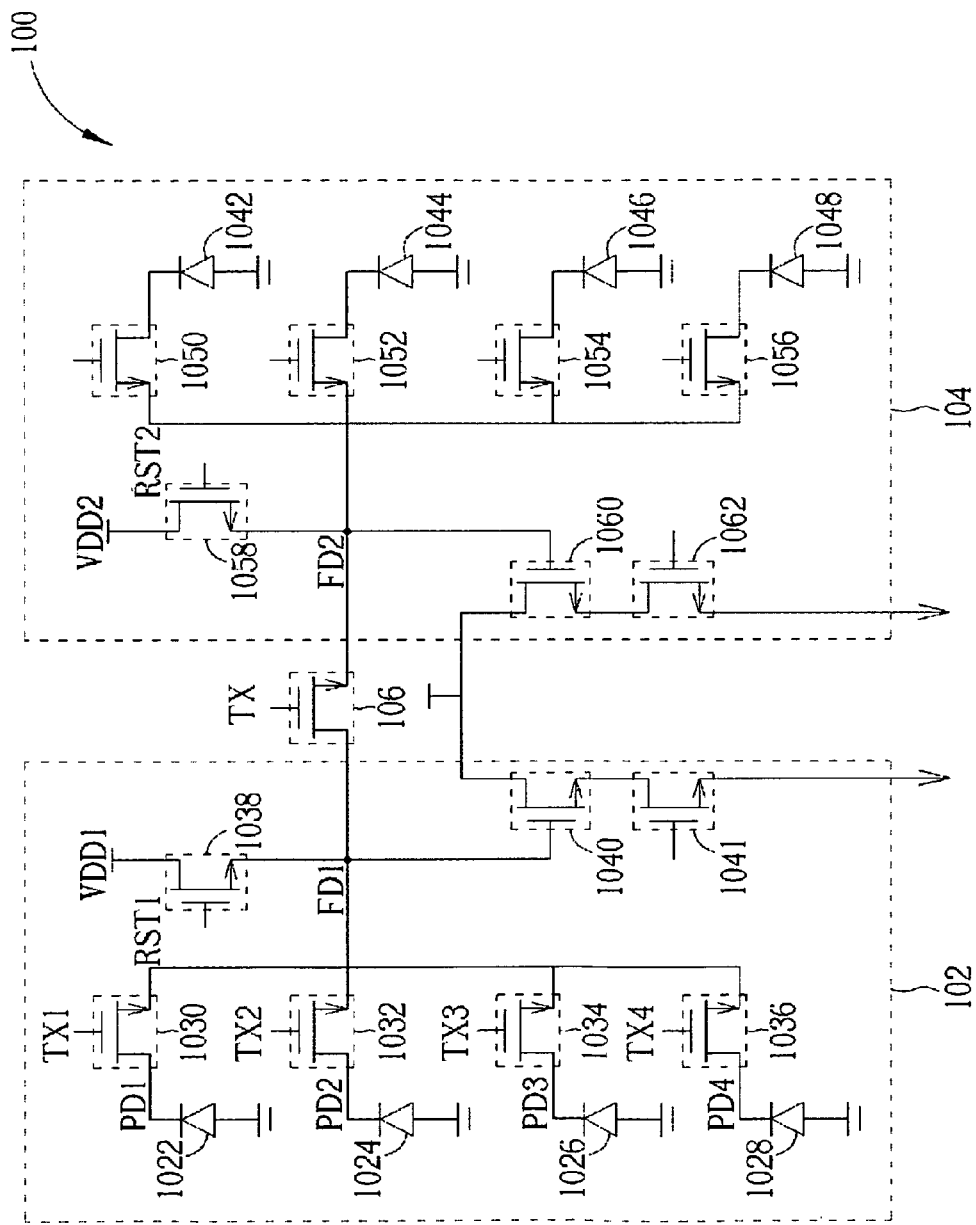
FIG. 1 is a diagram illustrating an image sensor according to an exemplary embodiment of the present invention.

Please refer to FIG. 1, which is a diagram illustrating an image sensor according to an exemplary embodiment of the present invention. The image sensor 100 includes a first 4-shared pixel circuit 102, a second 4-shared pixel circuit 104 and a switch unit 106. Please note that the two 4-shared pixel architectures employed here are for illustrative purposes only. In practice, any multi-shared or non-shared pixel architecture may be used. For example, the first 4-shared pixel circuit 102 may be replaced by an M-shared pixel architecture, and the second 4-shared pixel circuit 104 may be replaced by an N-shared pixel architecture, wherein both M and N are integers not smaller than one, and M may be equal to or different from N, depending upon actual design considerations/requirements.

In this embodiment, the first 4-shared pixel circuit 102 includes four sets of pixel photosensitive units. In normal operation, the switch unit 106 is turned off to separate a first floating diffusion area FD1 from a second floating diffusion area FD2. A first photodiode 1022 is utilized to perform a exposure process, wherein the generated electric charge is passed to the first floating diffusion area FDI via a first transistor 1030. The first source follower 1040 converts the electric charge in the first floating diffusion area FD1 to voltage which is transmitted to the following circuit via a first select transistor 1041. It should be noted that in other embodiments the select transistor may be optional. Similarly, a second photodiode 1024 is utilized to perform an exposure process, wherein the generated electric charge is passed to the first floating diffusion area FD1 via a second transistor 1032. The first source follower 1040 converts the electric charge in the first floating diffusion area FD1 to voltage which is transmitted to the following circuit via the first select transistor 1041. A third photodiode 1026 is utilized to perform a exposure process, wherein the generated electric charge is passed to the first floating diffusion area FD1 via a third transistor 1034. The first source follower 1040 converts the electric charge in the first floating diffusion area FD1 to voltage which is transmitted to the following circuit via the first select transistor 1041. Lastly, a fourth photodiode 1028 is utilized to perform an exposure process, wherein the generated electric charge is passed to the first floating diffusion area FD1 via a fourth transistor 1036. The first source follower 1040 converts the electric charge in the first floating diffusion area FD 1 to voltage which is transmitted to the following circuit via the first select transistor 1041. Please note that the first transistor, the second transistor, the third transistor, the fourth transistor and the first select transistor are used as switches in this embodiment, but any circuit with a similar switch function also belongs to the scope of the present invention.

Similarly, the second 4-shared pixel circuit 104 also includes four sets of pixel photosensitive units. A fifth photodiode 1042 is utilized to perform an exposure process, wherein the generated electric charge is passed to the second floating diffusion area FD2 via a sixth transistor 1050. The second source follower 1060 converts the electric charge in the second floating diffusion area FD2 to voltage which is transmitted to the following circuit via a second select transistor 1062. Next, a sixth photodiode 1044 is utilized to perform an exposure process, wherein the generated electric charge is passed to the second floating diffusion area FD2 via a seventh transistor 1052. The second source follower 1060 converts the electric charge in the second floating diffusion area FD2 to voltage which is transmitted to the following circuit via the tenth transistor 1062. A seventh photodiode 1046 is utilized to perform an exposure process, wherein the generated electric charge is passed to the second floating diffusion area FD2 via an eighth transistor 1054. The second source follower 1060 converts the electric charge in the second floating diffusion area FD2 to voltage which is transmitted to the following circuit via the tenth transistor 1062. Lastly, an eighth photodiode 1048 is utilized to perform an exposure process, wherein the generated electric charge is passed to the second floating diffusion area FD2 via a ninth transistor 1056. The second source follower 1060 converts the electric charge in the second floating diffusion area FD2 to voltage which is transmitted to the following circuit via the tenth transistor 1062. Please note that the sixth transistor, the seventh transistor, the eighth transistor, the ninth transistor and the second select transistor are used as switches in this embodiment, but any circuit with a similar switch function also belongs to the scope of the present invention.

Figure 2:
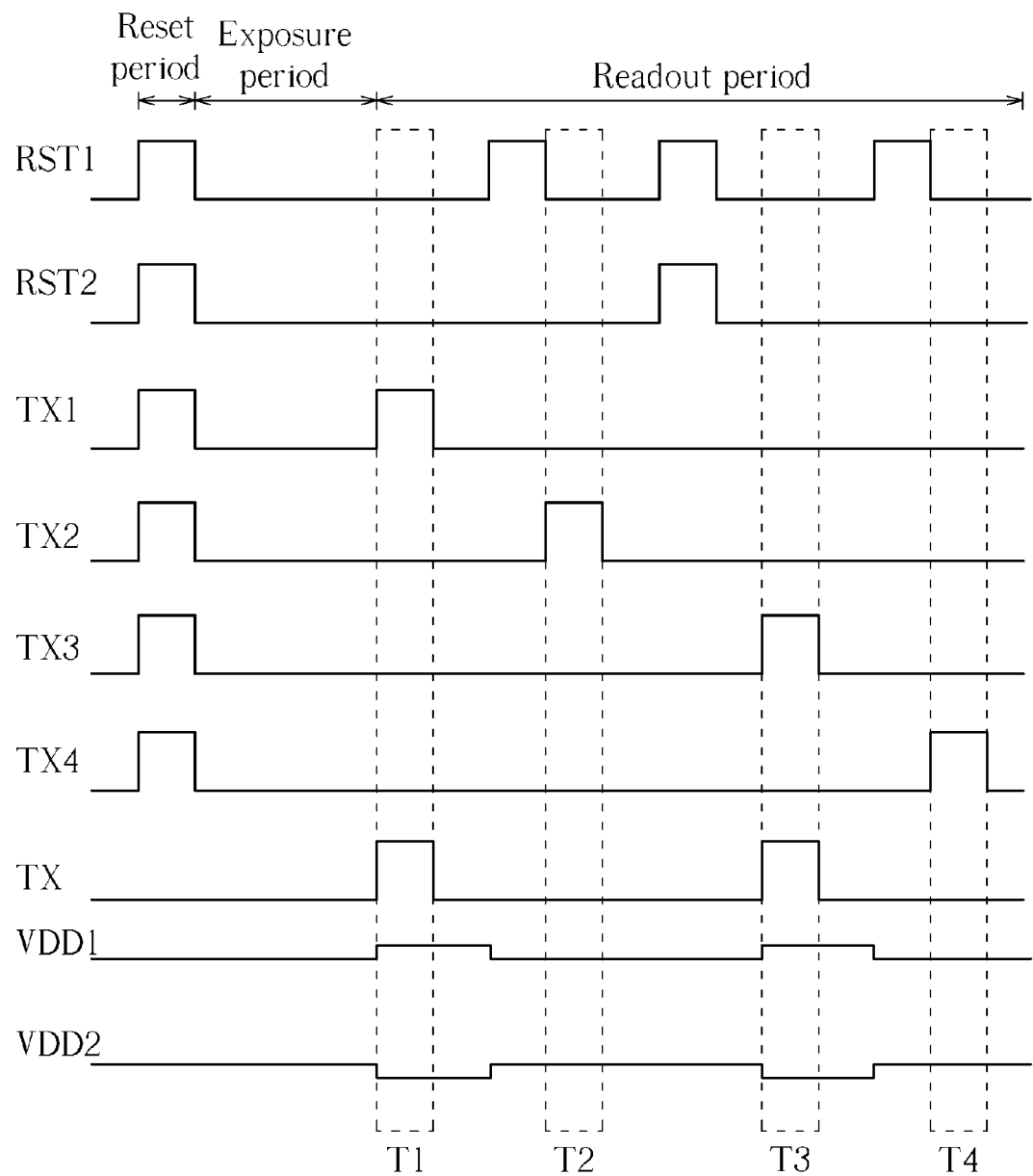
FIG. 2 is a timing diagram illustrating the dual readout speed operation mode of the image sensor shown in FIG. 1.

In this embodiment, a dual readout speed operation mode is further provided. For a image sensor with rolling shutter, the exposure process of each pixel row is started sequentially, and is read out row by row. For instance, the first 4-shared pixel circuit 102 and the second 4-shared pixel circuit 104 belong to different rows, and the two 4-shared pixel circuits 102, 104 are not activated to be read out at the same time. Therefore, the second floating diffusion area FD2, second source follower 1060 and the second select transistor 1062 can be borrowed from the second 4-shared pixel circuit 104 when the first 4-shared pixel circuit 102 is activated to be read out. Conversely, the first source follower 1040 and the first select transistor 1042 can be borrowed from the first 4-shared pixel circuit 102 when the second 4-shared pixel circuit 104 is activated to be read out. For more specific details, please refer to FIG. 2 in conjunction with FIG. 1. FIG. 2 is a timing diagram illustrating the dual readout speed operation mode of the image sensor 100. FIG. 2 is based on the scenario that the first 4-shared pixel circuit 102 is activated to be read out and the second 4-shared pixel circuit 104 is deactivated to be read out. First, in a rest period, a reset transistor 1038 and a reset transistor 1058 are turned on respectively by a first reset signal RST1 and a second reset signal RST2, and the first transistor 1030, the second transistor 1032, the third transistor 1034 and the fourth transistor 1036 are respectively turned on by a first signal TX1, a second signal TX2, a third signal TX3 and a fourth signal TX4 for resetting the first photodiode 1022, the second photodiode 1024, the third photodiode 1026 and the fourth photodiode 1028. Next, in an exposure period, the photodiodes start to receive lights to generate electrical charges.

Figure 3:
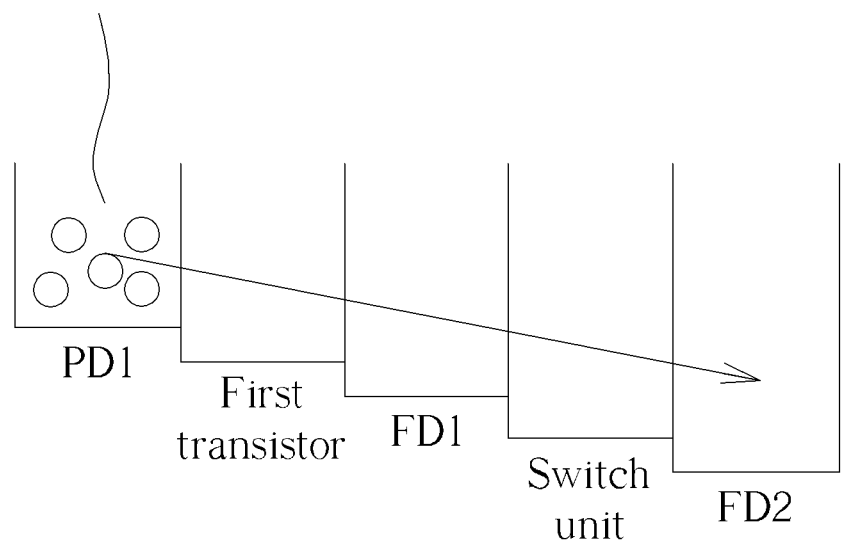
FIG. 3 is a diagram illustrating the energy levels of different nodes of the image sensor in FIG. 1 at the first time period.

Then, in a readout period, the photodiodes are read out. During a time period T1 in FIG. 2, the first signal TX1 and the switch signal TX both go high for transmitting the result of the first photodiode 1022 to the source follower 1060. Please note that a voltage level VDD1 is deliberately pulled higher and a voltage level VDD2 is deliberately pulled lower for allowing the electric charge to transfer smoothly to the source follower 1060 across the switch unit 106. Please refer to FIG. 3, which is a diagram illustrating the energy levels of different nodes of the image sensor 100 during the time period T1. It can be seen from FIG. 3 that the energy level of a node PD1 of the photodiode 1022 is the highest compared to the energy level of the first floating diffusion area FD1 and the energy level of the second floating diffusion area FD2, and the energy level of the second floating diffusion area FD2 is the lowest. Therefore, the electric charge generated by the first photodiode 102 goes from the node PD1 to the second floating diffusion area FD2 smoothly. While transfer complete, the first diffusion area FD1 is then reset by asserting the first reset signal RST1, and the switch signal TX is de-asserted.

Figure 4:
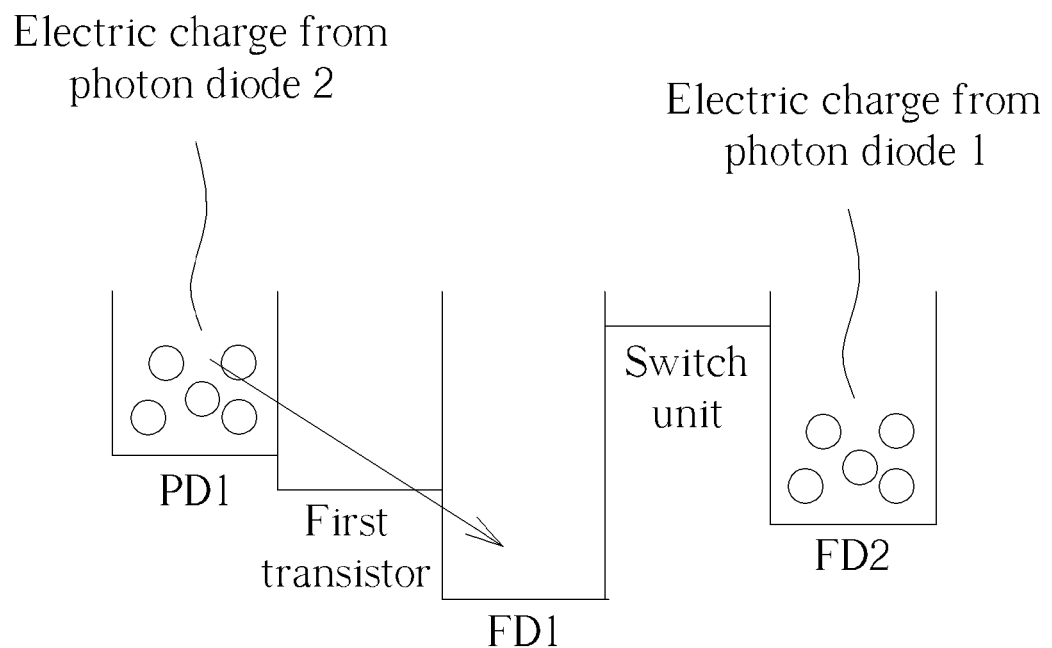
FIG. 4 is a diagram illustrating the energy levels of different nodes of the image sensor in FIG. 1 at the second time period.

During a time period T2 in FIG. 2, the second signal TX2 is asserted for transmitting the result of the second photodiode 1024 to the source follower 1040. Please note that the voltage level VDD1 is slightly lower and the voltage level VDD2 is slightly higher than in the previous case. Please refer to FIG. 4, which is a diagram illustrating the energy levels of different nodes of the image sensor 100 during the time period T2. It can be seen from FIG. 4 that the energy level of the first floating diffusion area FD1 is the lowest compared to a energy level of a node PD2 and the energy level of the second floating diffusion area FD2. The switch unit 106 forms a barrier to prevent the electric charge generated by the second photodiode 104 from entering the second floating diffusion area FD2. Therefore, the electric charge generated by the second photodiode 104 goes from the photodiode PD2 to the first floating diffusion area FD1 smoothly.

After the electric charges of the first photodiode 102 and the second photodiode 104 are transferred to the source followers 1040 and 1060 respectively, the electric charges will be converted to voltages and then passed to the following circuit, such as a readout circuit. Since the following circuit takes more time than the photosensitive circuit, borrowing the source follower 1060 and the readout circuit from the second 4-shared pixel circuit 104 allows the whole process to be about twice as fast as in the normal operation mode. The third photodiode 106 and the fourth photodiode 108 are operated in the same way.

Figure 5:
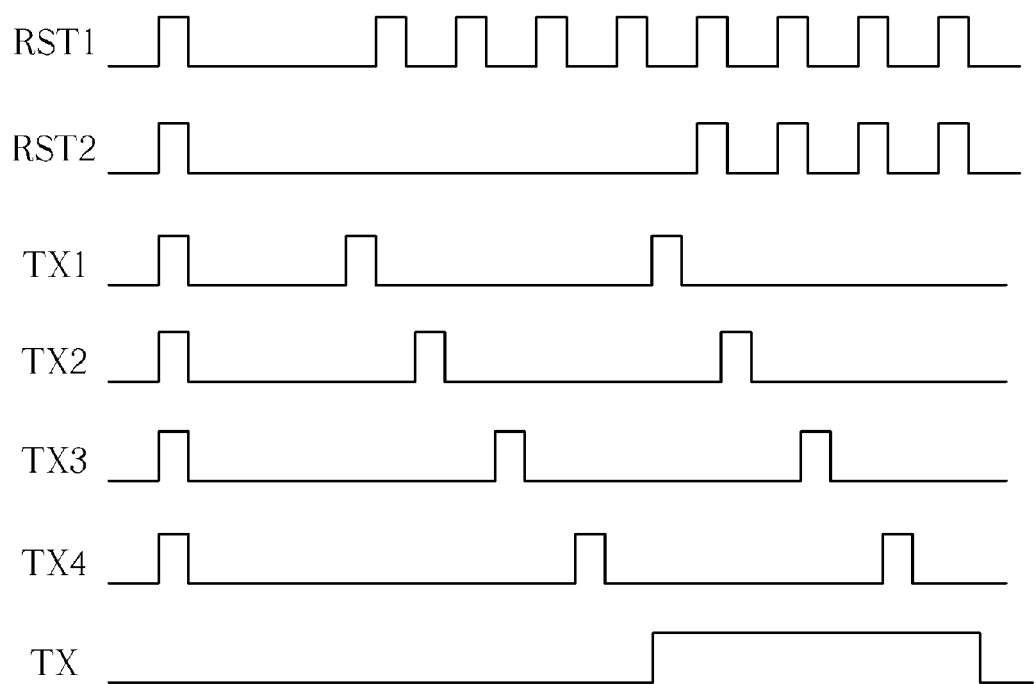
FIG. 5 is a timing diagram illustrating the dual conversion gain operation mode of the image sensor shown in FIG. 1.

Another dual conversion gain operation mode is provided in the embodiment. Please refer to FIG. 5, which is a timing diagram illustrating the dual conversion gain operation mode of the image sensor 100. For the dual conversion gain operation mode, the exposure process of each pixel is repeated with the switch unit 106 turned on after the exposure process of each pixel has been performed with the switch unit 106 turned off, i.e. the exposure process of each pixel is performed twice: with the switch unit 106 on; and with the switch unit 106 off. When the switch unit 106 is on, the floating diffusion capacitance will increase to be around twice as much as in the normal operation mode. This means that the new conversion gain will decrease to half that of the normal operation mode. By utilizing the two different conversion gains obtained from the normal operation mode and the dual conversion gain operation mode, a higher dynamic range image can thereby be obtained.

The present invention is capable of overcoming the speed limitation of the K-shared pixel architecture (wherein K may be any possible number), and approximately doubles the throughput of the pixel circuit by adding overhead of one switch (e.g. one transistor) and additional control.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:
1. An image sensor, comprising:
 an M-shared pixel architecture being powered by a first voltage level, wherein M is an integer not smaller than two;

an N-shared pixel architecture being powered by a second voltage level, wherein N is an integer not smaller than two; and a switch unit, coupled between a floating diffusion node of the M-shared pixel architecture and a floating diffusion node of the N-shared pixel architecture;

wherein when the M-shared pixel architecture is activated and the N-shared pixel architecture is deactivated, the first voltage level is higher than the second voltage level, and the switch unit turns on to transmit a sensing result of the M-shared pixel architecture to the floating diffusion node of the N-shared pixel architecture so as to output the transmitted sensing result from the N-shared pixel architecture.

2. The image sensor of claim 1, wherein the switch unit is further arranged to transmit a sensing result of the N-shared pixel architecture to the M-shared pixel architecture, where the sensing result of the N-shared pixel architecture is outputted by the M-shared pixel architecture.

3. The image sensor of claim 1, wherein the switch circuit alternately transmits the sensing result of the M-shared pixel architecture and the sensing result of the N-shared pixel architecture.

4. The image sensor of claim 1, wherein the switch unit is arranged to alternately transmit the sensing result of the M-shared pixel architecture to the N-shared pixel architecture and prevent the sensing result of the M-shared pixel architecture from being transmitted to the N-shared pixel architecture.

5. The image sensor of claim 1, wherein the M-shared pixel architecture comprises:
   a first photodiode;
   a second photodiode;
   a first transistor, having a drain terminal coupled to the first photodiode;
   a second transistor, having a drain terminal coupled to the second photodiode;
   a reset transistor, having a source terminal coupled to a source terminal of the first transistor and a source terminal of the second transistor; and
   a source follower, coupled to the source terminal of the reset transistor, the source terminal of the first transistor and the source terminal of the second transistor.

6. The image sensor of claim 5, wherein the M-shared pixel architecture further comprises:
   a select transistor, having a drain terminal coupled to the source follower.

7. The image sensor of claim 5, wherein the M-shared pixel architecture further comprises:
   a third photodiode;
   a fourth photodiode;
   a third transistor, having a drain terminal coupled to the third photodiode; and
   a fourth transistor, having a drain terminal coupled to the fourth photodiode;
   wherein the source terminal of the reset transistor is coupled to a source terminal of the third transistor, and a source terminal of the fourth transistor; and the source follower is coupled to the source terminal of the third transistor, and the source terminal of the fourth transistor.

8. The image sensor of claim 1, wherein the N-shared pixel architecture comprises:
   a first photodiode;
   a second photodiode;
   a first transistor, having a drain terminal coupled to the first photodiode;
   a second transistor, having a drain terminal coupled to the second photodiode;
   a reset transistor, having a source terminal coupled to a source terminal of the first transistor and a source terminal of the second transistor; and
   a source follower, coupled to the source terminal of the reset transistor, the source terminal of the first transistor and the source terminal of the second transistor.

9. The image sensor of claim 8, wherein the N-shared pixel architecture further comprises:
   a select transistor, having a drain terminal coupled to the source follower.

10. The image sensor of claim 8, wherein the N-shared pixel architecture comprises:
    a third photodiode;
    a fourth photodiode;
    a third transistor, having a drain terminal coupled to the third photodiode; and
    a fourth transistor, having a drain terminal coupled to the fourth photodiode;
    wherein the source terminal of the reset transistor is coupled to a source terminal of the third transistor, and a source terminal of the fourth transistor; and the source follower is coupled to the source terminal of the third transistor, and the source terminal of the fourth transistor.

* * * * *